United States Patent [19]

Tokuhara et al.

[11] Patent Number: 4,560,242
[45] Date of Patent: Dec. 24, 1985

[54] VARIABLE MAGNIFICATION OPTICAL SYSTEM

[75] Inventors: Mitsuhiro Tokuhara, Chigasaki; Yu Yamada, Tokyo, both of Japan

[73] Assignee: Canon Kabushiki Kaisha, Tokyo, Japan

[21] Appl. No.: 606,858

[22] Filed: May 4, 1984

Related U.S. Application Data

[63] Continuation of Ser. No. 311,446, Oct. 14, 1981, abandoned.

[30] Foreign Application Priority Data

Oct. 15, 1980 [JP] Japan .................. 55-144804

[51] Int. Cl.$^4$ .................. G02B 15/16; G02B 17/00
[52] U.S. Cl. .................. 350/425; 350/446
[58] Field of Search .................. 350/423, 425, 446

[56] References Cited

U.S. PATENT DOCUMENTS

| | | | |
|---|---|---|---|
| 3,687,522 | 8/1972 | Lynch et al. | 350/425 |
| 3,728,010 | 4/1973 | Mikami | 350/425 |
| 3,731,990 | 5/1973 | Van Orden | 350/446 |
| 4,037,937 | 7/1977 | Minoura | 350/425 |
| 4,061,419 | 12/1977 | Price et al. | 350/425 |
| 4,149,774 | 4/1979 | Hirano et al. | 350/425 |

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

A variable magnification optical system includes two movable groups of the so-called symmetric orthometer type each of which includes a positive power lens, a negative power lens and a meniscus positive lens that are in sequence disposed symmetrically with respect to a diaphragm, said optical system further including negative lenses mounted outside said movable groups symmetrically with respect to said diaphragm to form a fixed group, said movable groups being moved along the optical axis relative to said fixed group in symmetrical fashion with respect to said diaphragm to vary the focal length of said optical system, the entire optical system being moved as one body to bring the object and image planes into a position that they are optically conjugate with each other.

21 Claims, 24 Drawing Figures

VARIABLE MAGNIFICATION OPTICAL SYSTEM

This application is a continuation of application Ser. No. 311,446 filed Oct. 14, 1981, now abandoned.

BACKGROUND OF THE INVENTION

1. Field of the Invention

This invention relates to a variable magnification optical system, particularly used in copying machines and others, having a compact construction in which, upon changing the magnification, it can be moved as one body while predetermined lenses in the lens system can be moved with a small movement distance to reduce aberrations.

2. Description of the Prior Art

In the prior art copying machines and others wherein a fixed focus lens is used as a projector system, it has been required that, upon changing of the magnification, the mirror was moved with the lens for compensating the optical path length dependent on the changed magnification. The lens is generally separated spatially from the mirror for compensating the optical path length resulting in a difficulty on the continuous change of the magnification. In general, therefore, the degrees of magnification have been non-continuously selected and stepwisely changed.

It is cumbersome, however, that the mirror for compensating the optical path length is moved upon the changing of the magnification. It is desirable to change the magnification merely by moving the lens. It is further desirable that the extremities of an image can be aligned with one another by trimming, that is, minutely changing the magnification in the copying machines. Thus, a proposal has been made that the continuous change of the magnification may be effected by using a zoom lens in the copying machines U.S. Pat. No. 4,037,937 and others disclose photoengraving zoom lenses. When these zoom lenses are assembled into the projecting systems in the copying machines, problems are brought about by difficult compaction, small angle of view and large F-number.

U.S. Pat. Nos. 3,687,522 and 4,061,419 disclose compact zoom lens systems of the so-called symmetric orthometer type in each of which one or two lens elements therein can be moved upon zooming. Either of such compact zoom lens systems includes only six lenses resulting in reduced degrees of freedom in compensating aberrations. Accordingly, there is a problem in that the aberrations cannot be correctly set upon changing the magnification to reduce the resolving power.

U.S. Pat. No. 3,728,010 discloses a zoom lens system in which positive lenses are located outside the symmetric orthometer type lens arrangement symmetrically with respect to a diaphragm to form a fixed group. In this zoom lens system, lenses other than the positive lenses disposed outside as the fixed group are moved symmetrically relative to the diaphragm without change of the length of the lens system along the optical axis. However, there are problems in that the movable lenses are shifted through too large a distance and that the entire positive power in the movable lens group tends to be summed into the positive power in the fixed group to increase the Petzval Sum.

SUMMARY OF THE INVENTION

It is an object of this invention to provide a variable magnification optical system which can continuously change its magnification when an image on the stationary object plane is projected onto the stationary image plane.

Another object is to provide a variable magnification optical system having a compact construction in which the lenses can be less moved upon changing of magnification.

Still another object is to provide a variable magnification optical system which can change its magnification without change of the optical path length between the stationary object plane and the stationary image plane.

A further object is to provide a variable magnification optical system in which various aberrations are effectively eliminated.

According to this invention, a variable magnification optical system comprises a fixed pair of fixed lenses shaped symmetrically with respect to a diaphragm and a pair of lens groups disposed inside the fixed pair of lenses, said lens groups defining a positive lens subsystem and shaped symmetrically with respect to the same diaphragm. Each of the lens groups comprises, in sequence from the diaphragm, a first meniscus positive lens having a concave surface faced to the diaphragm, a second negative lens having a concave surface faced to the diaphragm and a third positive lens having a convex surface opposite from the diaphragm. The fixed lenses each comprise a negative single lens. When the magnification is changed to non-one-to-one magnification, the fixed lenses are not moved with respect to the diaphragm while each of the lens groups is shifted as one body relative to the diaphragm. Thus, the optical system will be changed in focal length. Furthermore, the entire optical system can be moved as one body along the optical axis to bring the object plane into an optically conjugate relation with the image plane. When it is wanted to project an image on the image plane onto the object plane in a magnification larger than the actual image size, the optical system is moved toward the object plane from the one-to-one magnification position. When it is required to form an image in a magnification smaller than the actual image size, the optical system is moved toward the image plane from the one-to-one magnification position. Thus, magnification can be changed by shifting said pair of lens groups to maintain the symmetrical relation with respect to the diaphragm while at the same time moving the entire optical system as one body along the optical axis.

In other words, a variable magnification optical system comprises, in sequence from the object plane to the image plane, a first negative lens, a second positive lens, a third negative lens, a fourth positive lens, a diaphragm, a fifth positive lens having the same shape as that of said fourth positive lens, a sixth negative lens having the same shape as that of said third negative lens, a seventh positive lens having the same shape as that of said second positive lens and an eighth negative lens having the same shape as that of said first negative lens, each pair of said lenses of the same shape being disposed symmetrically relative to each other with respect to said diaphragm. Each of said fourth and fifth positive lenses is in the form of a meniscus lens having a concave surface faced to the diaphragm. Each of the third and sixth negative lenses is in the form of a negative lens having a concave surface faced to the diaphragm. Each of the second and seventh positive lenses is in the form of a positive lens having a surface opposite from the diaphragm which is concave with respect to the diaphragm. Said first and eighth negative lenses are not moved relative to the diaphragm when the magnification is changed. However, a group consisting of the second, third and fourth lenses and another group consisting of the fifth, sixth and seventh lenses are shifted, as one body in each group, relative to the diaphragm upon the changing of magnification so that the entire optical system will be changed in focal length. Furthermore, the entire optical system can be moved as one body along the optical axis to bring the object plane into a conjugate relationship with the image plane.

In the variable magnification optical system according to this invention, either of the third negative lens or the sixth negative lens may be in the form of a lens assembly consisting of a positive lens and a negative lens which are bonded to each other. If desired, the second positive lens and the third negative lens may be bonded to each other while the sixth negative lens and the seventh positive lens may be bonded to each other.

In the variable magnification optical system according to this invention, further, concave lenses (first negative lens and eighth negative lens) are fixed relative to the diaphragm at the opposite sides of the optical system to increase the positive power in the movable lens group consisting of the second, third and fourth lenses or the movable lens group consisting of the fifth, sixth and seventh lenses. Accordingly, these movable lens groups will have advantageously less movement when changing the focal length of the optical system. If the negative powers in the first and eighth lenses are too large, said movable lens groups cannot satisfactorily compensate aberrations. However, if $|F_2/F_1| > 1.5$ is fulfilled where the focal length of the first or eighth lens is $F_1$ and the focal length of the movable lens groups is $F_2$, the aberrations can be effectively compensated.

Where the third negative lens and the sixth negative lens are constituted of the bonded lens elements as described hereinbefore, it is desirable that each of the second and seventh positive lenses is in the form of a positive meniscus lens having a concave surface faced to the diaphragm. It is also desirable that each of the third and sixth negative lenses is in the form of a meniscus lens having a concave surface faced to the diaphragm.

In accordance with this invention, the variable magnification optical system may be used as an in-mirror type zoom lens system with a plane reflection mirror located in place of a diaphragm since the lenses thereon are completely symmetrically disposed with respect to the diaphragm in their shapes and locations. In this case, the optical system comprises a first negative lens, a second positive lens, a third negative lens, a fourth positive lens and a diaphragm which are located in sequence from the object side. The first through fourth lenses are of the same shape as those of the above-mentioned transmission type lens system and therefore will not be further described herein. In order to change the entire lens system in its focal length, the second, third and fourth lenses are moved as one body relative to the plane mirror with the first negative lens being fixed relative to the plane mirror. Furthermore, the in-mirror zoom lens system can be entirely moved so as to bring the object plane into a conjugate relation with the image plane. Where the zoom lens system is of a reflection type, the conjugate relation between the object and image planes cannot be obtained merely by moving the in-mirror zoom lens system. In order to accomplish this, it is required to provide other optical members which are located in the optical path of the optical system.

DESCRIPTION OF THE PREFERRED EMBODIMENTS

Figure 1:
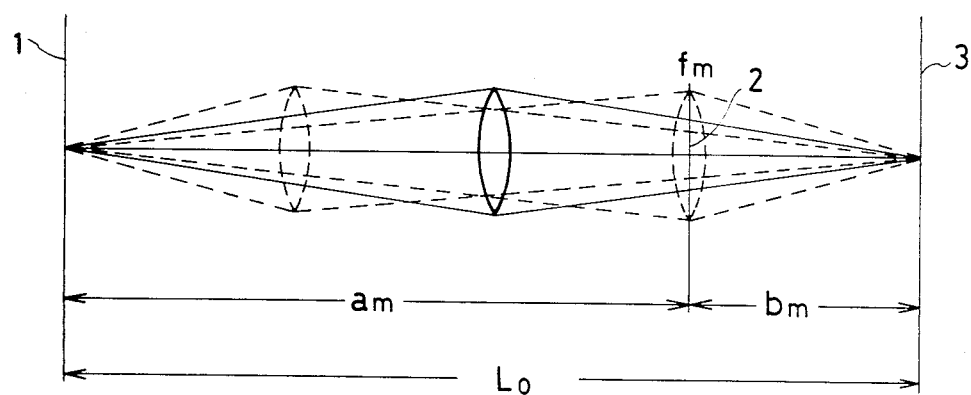
FIG. 1 is a view illustrating the principle of a zoom lens system relating to this invention.

Referring to FIG. 1, a predetermined area on an original 1 is projected onto a predetermined area on an image plane 3 through a zoom lens system 2 which provides different focuses at its different positions along the optical axis. The predetermined areas depends on the angle of view in the zoom lens system 2.

It is now supposed that, in a predetermined magnification m, the optical axis distance between the original 1 and the zoom lens system 2 is $a_m$, the optical axis distance between the zoom lens 2 and the image plane 3 is $b_m$, and the focal length of the zoom lens 2 is $f_m$. It is also assumed that the optical axis distance $L_o$ between the original 1 and the image plane 3 is unchanged independently of the magnification m. The following relationships are provided:

$$1/a_m + 1/b_m = 1/f_m \qquad (1)$$

$$m - b_m/a_m \quad (2)$$

$$L_o = a_m + b_m \quad (3)$$

From these formulas (1), (2) and (3), the location and focal length in the zoom lens 2 are specified as follows:

$$a_m = L_o/m + 1 \text{ and}$$

$$f_m = L_o/(\sqrt{m} + 1/\sqrt{m})^2.$$

For example, if it is desired that the zoom lens system 2 is changed from the one-to-one magnification position to a reduction position, it is moved toward the image plane 3 with the absolute value of the focal length $f_m$ being reduced. On the contrary, if it is desired that the zoom lens 2 is changed from the one-to-one magnification position to an enlargement position, it is moved toward the original 1 with the absolute value of the focal length $f_m$ being reduced. Namely, the zoom lens system 2 will have the maximum focal length thereof in the one-to-one magnification position. At this time, the absolute value thereof becomes $L_o/4$.

The absolute value of the focal length $f_m$ is changed by moving predetermined lenses in the zoom lens system 2 dependent on the magnification m.

Figure 2A:
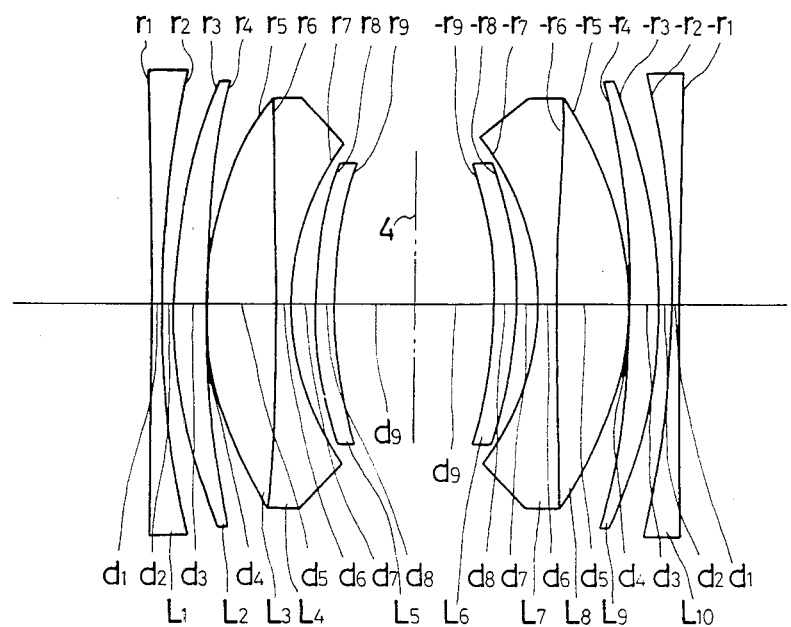
FIG. 2A is a cross-sectional view showing a lens system which is a first embodiment of this invention.

FIG. 2A shows a zoom lens system of a first embodiment of this invention which is a one-to-one magnification system. This zoom lens system comprises ten single lenses $L_1$ through $L_{10}$. The single lenses $L_3$ and $L_4$; $L_7$ and $L_8$ are respectively bonded to each other. The paired single lenses $L_1$ and $L_{10}$; $L_2$ and $L_9$; $L_3$ and $L_8$; $L_4$ and $L_7$; $L_5$ and $L_6$ are respectively disposed symmetrically relative to each other with their identical shapes directed opposite to each other.

Now, supposing that the curvature radii in the first and second surfaces of the single lens $L_1$ are respectively $\gamma_1$ and $\gamma_2$, the curvature radii in the first and second surfaces of the single lens $L_{10}$ are respectively $-\gamma_2$ and $-\gamma_1$. Similarly, supposing that the curvature radii in the first and second surfaces of the single lens $L_2$ are respectively $\gamma_3$ and $\gamma_4$, the curvature radii in the first and second surfaces of the single lens $L_9$ are respectively $-\gamma_4$ and $-\gamma_3$. In such a manner, the curvature radii in the first and second surfaces of the single lenses $L_3$, $L_4$ and $L_5$ are defined to be $\gamma_5$, $\gamma_6$; $\gamma_6$, $\gamma_7$; and $\gamma_8$, $\gamma_9$.

Due to the symmetry in the zoom lens system, the thickness $d_1$ of the single lens $L_1$ is equal to that of the single lens $L_{10}$. Similarly, it is defined that the air gap between the single lenses $L_1$ and $L_2$ is $d_2$; the thickness of the single lens $L_2$ is $d_3$; the air gap between the single lenses $L_2$ and $L_3$ is $d_4$; the thicknesses of the single lenses $L_3$ and $L_4$ are respectively $d_5$ and $d_6$; the air gap between the single lenses $L_4$ and $L_5$ is $d_7$; the thickness of the single lens $L_5$ is $d_8$; and the gap between the single lens $L_5$ and a diaphragm 4 is $d_9$. The single lenses $L_2$ through $L_9$ form a so-called orthometer type lens or positive lens subsystem which has a forward group constituted of positive lenses (crown glass), negative lenses (fling glass and meniscus positive lenses with the entire power being positive. A rearward group is disposed symmetrically relative to the forward group with respect to the diaphragm.

In this embodiment, at the single lenses $L_3$ and $L_4$ are bonded to each other to form a negative lens (fling glass).

The single lenses $L_1$ and $L_{10}$ are disposed symmetrically with respect to the diaphragm 4 outside the orthometer type lens to form a concavo-concave or meniscus concave lens with the power being negative.

Suppoding that the lens length is 140 mm and the effective F-number is 11.2, the various values of the lenses in the first embodiment are represented as follows:

| | Curvature Radius $\gamma$ | Gap $d$ | Dispersion $v_d$ | Refractive index $n_d$ |
|---|---|---|---|---|
| 1 | −1130.16 | 4.10 | 42.80 | 1.5673 |
| 2 | 445.11 | 6.10 | — | 1 |
| 3 | 272.83 | 6.57 | 44.70 | 1.6825 |
| 4 | 2688.99 | 12.31 | — | 1 |
| 5 | 60.94 | 15.54 | 48.30 | 1.6667 |
| 6 | −594.38 | 5.34 | 37.00 | 1.6129 |
| 7 | 46.05 | 3.86 | — | 1 |
| 8 | 70.96 | 3.83 | 38.00 | 1.7234 |
| 9 | 98.16 | 12.31 | — | 1 |
| 10 | 0.0 | 12.31 | — | 1 |
| 11 | −98.16 | 3.83 | 38.00 | 1.7234 |
| 12 | −70.96 | 3.86 | — | 1 |
| 13 | −46.05 | 5.34 | 37.00 | 1.6129 |
| 14 | 594.38 | 5.54 | 48.30 | 1.6667 |
| 15 | −60.94 | 12.31 | — | 1 |
| 16 | −2688.99 | 6.57 | 44.70 | 1.6825 |
| 17 | −272.83 | 6.10 | — | 1 |
| 18 | −445.11 | 4.10 | 42.80 | 1.5673 |
| 19 | 1130.16 | — | — | 1 |

When the magnification is changed to non-one-to-one, the single lenses $L_1$ through $L_{10}$ are moved as one body along the optical axis. Simultaneously, the forward group consisting of the single lenses $L_2$ to $L_5$ and the rearward group consisting of the single lenses $L_6$ to $L_9$ are respectively moved as one body to position symmetrically relative to each other with respect to the diaphragm 4.

Figure 2B:
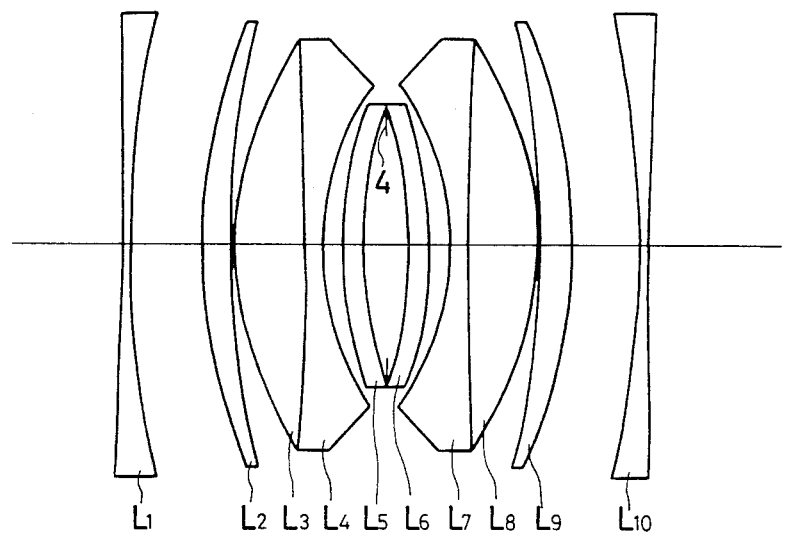
FIG. 2B is a view similar to FIG. 2A, showing the lens of FIG. 2A in a different position.

FIG. 2B shows the zoom lens system in a position that it has been changed in magnification. In such a position, the forward and rearward lens groups are moved toward the diaphragm, that is, to each other by the same distance along the optical axis.

The diaphragm 4 is spaced apart from the surface of the original 1 along the optical axis by $a_m$ ($\equiv L_o/m + 1$). On one-to-one magnification, $d_2$ is equal to 6.10 mm and $d_9$ is equal to 12.31 mm whereas $d_2$ and $d_9$ become equal to 6.96 mm and 11.45 mm respectively when the magnification m is changed to 0.86. When the magnification m is changed to 0.61, $d_2$ and $d_9$ become equal to 15.62 and 2.79 mm, respectively.

The negative lenses $L_1$ and $L_{10}$ serve to increase the entirely positive power in the forward lens group ($L_2$ to $L_5$) or the rearward lens group ($L_6$ to $L_9$) so that the movement of the forward or rearward lens group relative to the fixed lenses $L_1$ and $L_{10}$ will be decreased. This cannot be expected in any lens system wherein positive lenses are added thereto as a fixed lens group. If so, orthometer type, that is, movable type forward or rearward lens group would be decreased in its entirely positive power to increase the movement thereof relative to the fixed lens group.

In general, it is required to decrease the Petzval Sum so as to reduce the curvature of an image plane for compensating aberrations. Petzval Sum P can be represented by the following formula:

$$P = \sum_i \frac{\psi_i}{N_i}$$

where the power in each lens is $\psi_i$ and the difference in the refractive index of the medium is $N_i$. In the lens system according to this invention in which the negative lenses are added to the orthometer type lens system, each negative lens has a negative Petzval Sum component. By suitably selecting the refractive index in that negative lens, therefore, the degree of freedom for reducing the Petzval Sum can be increased. In this embodiment, the Petzval Sum is extremely small, that is, equal to 0.106.

Basically, any symmetry type lens system can be generally decreased in curvatures and aberrations such as chromatic aberration, comatic aberration and others. In addition to this, the lens system according to this invention can be further decreased in the Petzval Sum. Therefore, it can be said that this invention provides a zoom lens system which has entirely no aberration.

Figure 3:
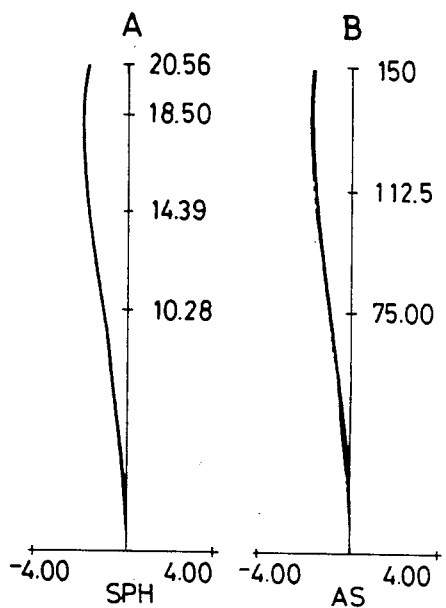
FIGS. 3, 4 and 5 are graphs illustrating various aberrations in the first embodiment shown in FIGS. 2A and 2B.
Figure 4:
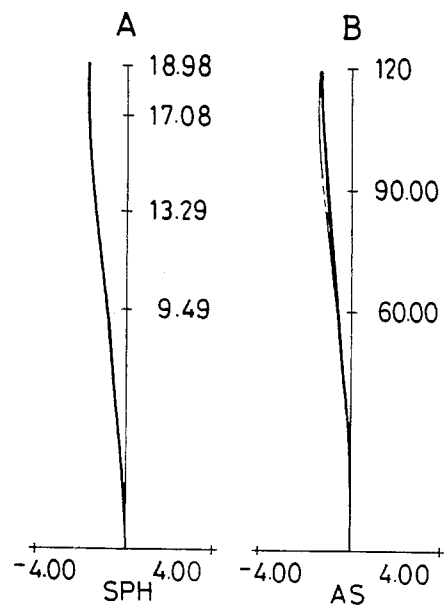
Figure 5:
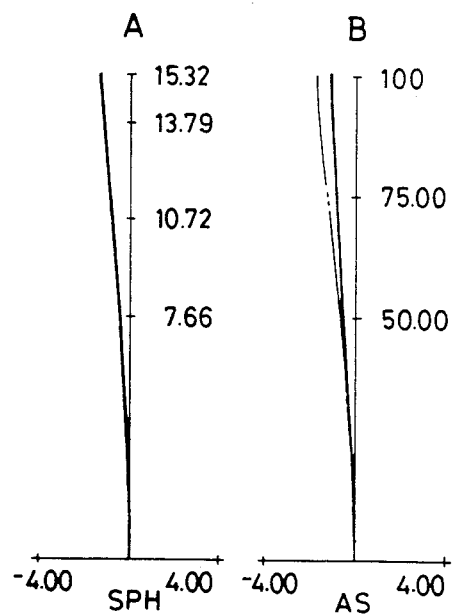

FIGS. 3, 4 and 5 show various aberrations in this embodiment. FIGS. 3A and 3B show spherical aberration and astigmatism in the one-to-one magnification (m=1.00), respectively. FIGS. 4A and 4B show similar aberrations in a first reduction (m=0.86), respectively. FIGS. 5A and 5B show similar aberrations in a second reduction (m−0.61), respectively. In these figures, solid lines show aberrations in the sagittal direction while two-dot chain lines show aberrations in the meridional direction. As to the spherical aberrations, the horizontal axes represent aberrations while the vertical axes designate heights of incidence. As to the astigmatisms, the horizontal axes denote aberrations while the vertical axes represent heights of image. In all of the figures, the unit is shown in millimeter (mm).

Figure 6A:
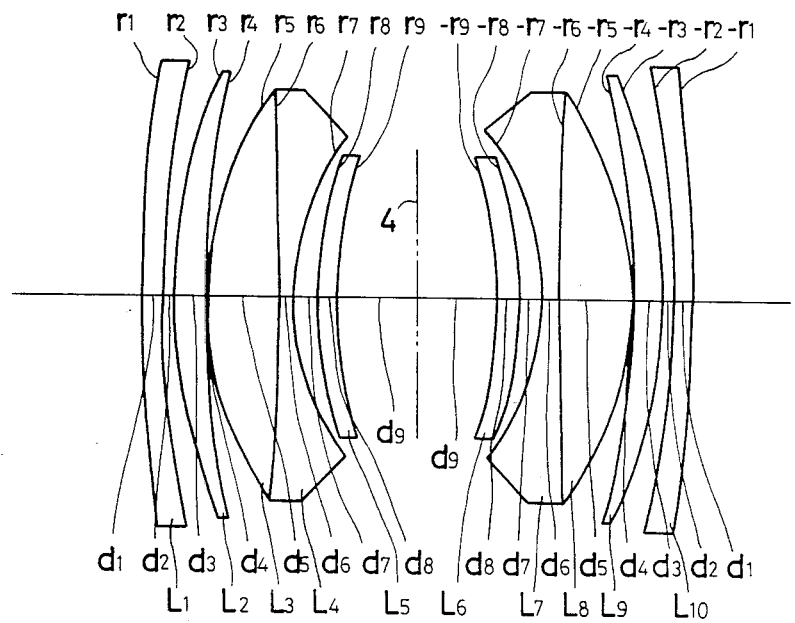
FIG. 6A is a cross-sectional view showing a lens system which is a second embodiment of this invention.
Figure 6B:
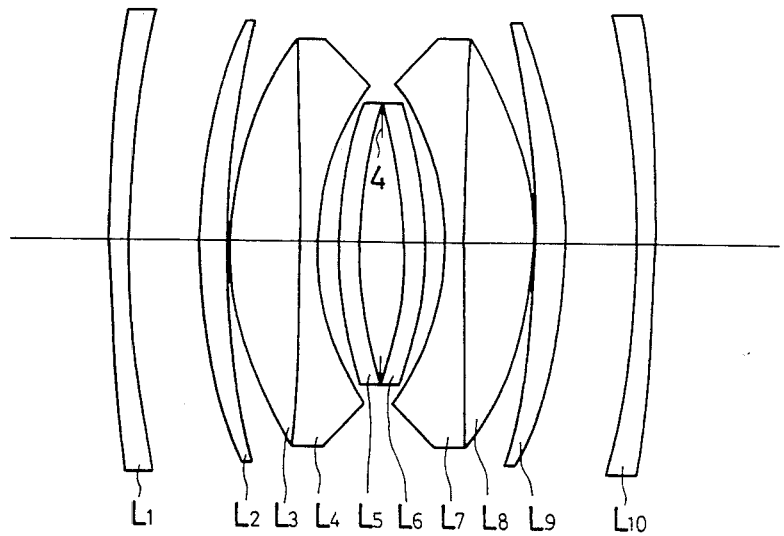
FIG. 6B is a view similar to FIG. 6A, showing the same lens system in a different position.

FIG. 6A is a cross-sectional view of a zoom lens system in its one-to-one magnification position which is a second embodiment of this invention, and FIG. 6B is a view similar to FIG. 6A, showing the same lens system in its changed (non-one-to-one) magnification position. Various values in the second embodiment are shown below.

|    | Curvature Radius $\gamma$ | Gap d | Dispersion $v_d$ | Refractive index $n_d$ |
|----|---------|-------|------|--------|
| 1  | 276.53  | 3.50  | 42.80 | 1.5673 |
| 2  | 171.04  | 1.98  | —    | 1      |
| 3  | 94.82   | 5.70  | 44.30 | 1.6700 |
| 4  | 163.08  | 0.49  | —    | 1      |
| 5  | 63.03   | 12.80 | 48.30 | 1.6667 |
| 6  | −683.57 | 2.73  | 39.20 | 1.5955 |
| 7  | 46.16   | 4.02  | —    | 1      |
| 8  | 73.22   | 4.20  | 50.90 | 1.6584 |
| 9  | 88.93   | 14.09 | —    | 1      |
| 10 | 0.0     | 14.09 | —    | 1      |
| 11 | −88.93  | 4.20  | 50.90 | 1.6584 |
| 12 | −73.22  | 4.02  | —    | 1      |
| 13 | −46.16  | 2.73  | 39.20 | 1.5955 |
| 14 | 683.57  | 12.80 | 48.30 | 1.6667 |
| 15 | −63.03  | 0.49  | —    | 1      |
| 16 | −163.08 | 5.70  | 47.30 | 1.6700 |
| 17 | −94.82  | 1.98  | —    | 1      |
| 18 | −171.04 | 3.50  | 42.80 | 1.5673 |
| 19 | −276.53 | —     | —    | 1      |

In the second embodiment of this invention, the gaps $d_2$ and $d_9$ are equal to 1.98 mm and 14.09 mm in the one-to-one magnification (m=1.00), respectively. In a changed magnification (m=0.63), the gaps $d_2$ and $d_9$ become equal to 12.40 mm and 3.67 mm, respectively.

Figure 7:
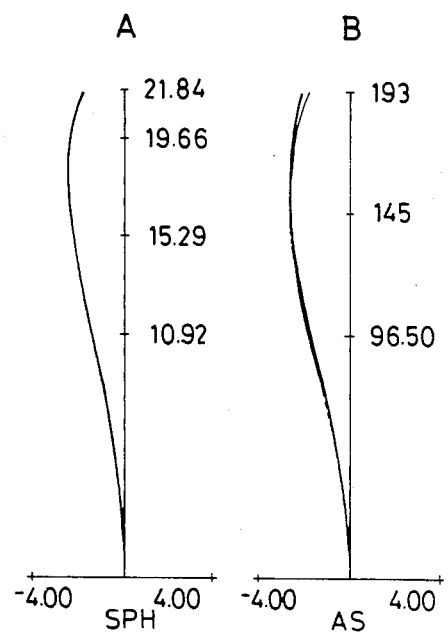
FIGS. 7 and 8 are graphs illustrating various aberrations in the second embodiment shown in FIGS. 6A and 6B.
Figure 8:
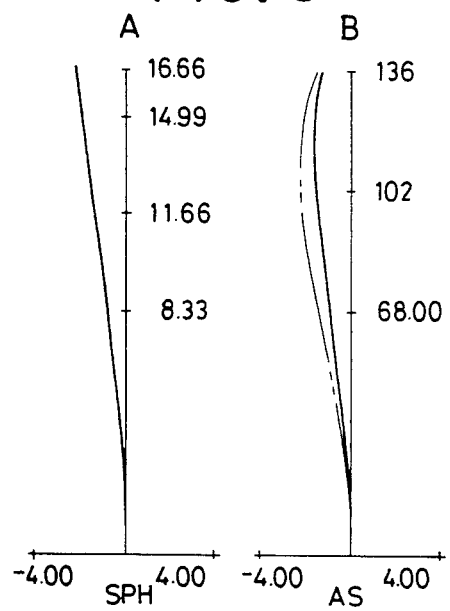

FIGS. 7A and 7B show spherical aberration and astigmatism respectively in the one-to-one magnification while FIGS. 8A and 8B show similar aberrations respectively in the changed magnification (m=0.63). It will be apparent from these figures that the Petzval Sum can be decreased to be equal to 0.086.

Figure 9A:
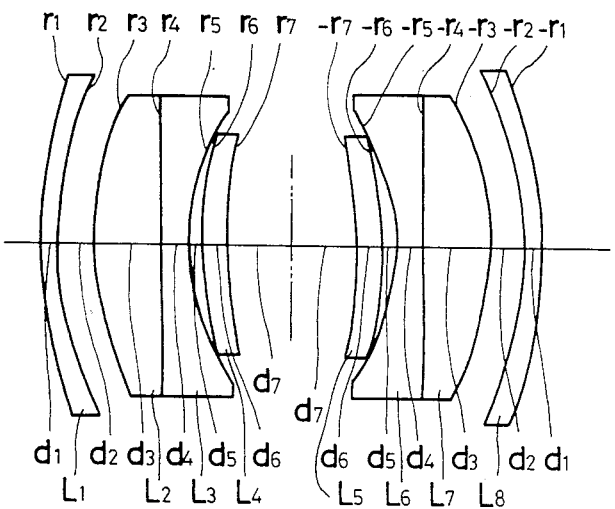
FIG. 9A is a cross-sectional view showing a lens system which is a third embodiment of this invention.

FIG. 9 shows a zoom lens system which is a third embodiment of this invention. This embodiment is different from the second embodiment in that each of the third and sixth negative lenses $L_3$ and $L_6$ is in the form of a single lens in the third embodiment. The second positive lens $L_2$ is bonded to the third negative lens $L_3$ while the sixth negative lens $L_6$ is bonded to the seventh positive lens $L_7$. Even in this lens system, Petzval Sum can be decreased to 0.095.

Various values in the lens system when the magnification is not changed are as follows:

|    | Curvature Radius $\gamma$ | Gap d | Dispersion $v_d$ | Refractive Index $n_d$ |
|----|---------|-------|-------|--------|
| 1  | 80.71   | 3.50  | 42.80 | 1.5673 |
| 2  | 67.45   | 6.47  | —     | 1      |
| 3  | 54.33   | 14.00 | 48.30 | 1.6667 |
| 4  | 1646.55 | 5.60  | 39.20 | 1.5955 |
| 5  | 42.61   | 2.27  | —     | 1      |
| 6  | 61.62   | 5.50  | 50.90 | 1.6584 |
| 7  | 100.46  | 12.84 | —     | 1      |
| 8  | 0.0     | 12.84 | —     | 1      |
| 9  | −100.46 | 5.50  | 50.90 | 1.6584 |
| 10 | −61.62  | 2.27  | —     | 1      |
| 11 | −42.61  | 5.60  | 39.20 | 1.5955 |
| 12 | −1646.55| 14.00 | 48.30 | 1.6667 |
| 13 | −54.33  | 6.47  | —     | 1      |
| 14 | −67.45  | 3.50  | 42.80 | 1.5673 |
| 15 | −80.71  | —     | —     | —      |

Figure 9B:
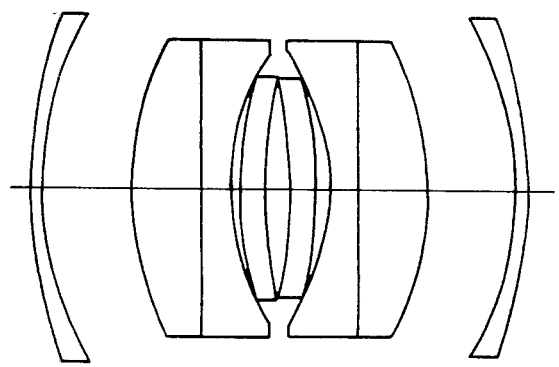
FIG. 9B is a view similar to FIG. 9A, showing the same lens system in a different position.

When the magnification m is changed to 0.63, the forward and rearward lens groups are moved symmetrically relative to each other w-th respect to the diaphragm as shown in FIG. 9B so that the gaps $d_2$ and $d_7$ will become equal to 16.75 mm and 2.55 mm, respectively.

Figure 10:
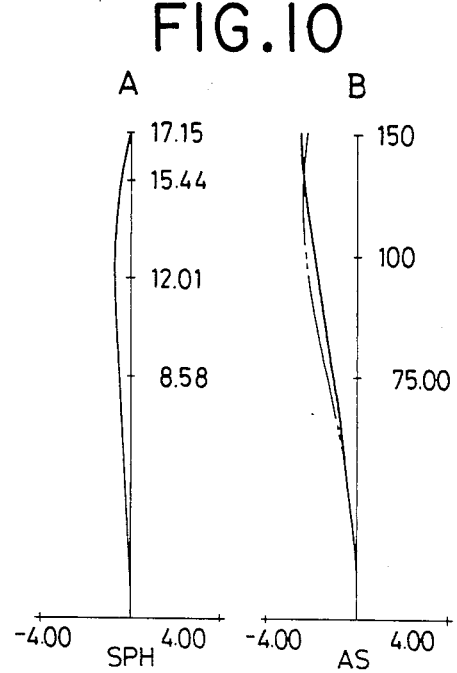
FIGS. 10 and 11 are graphs illustrating various aberrations in the third embodiment shown in FIGS. 9A and 9B.
Figure 11:
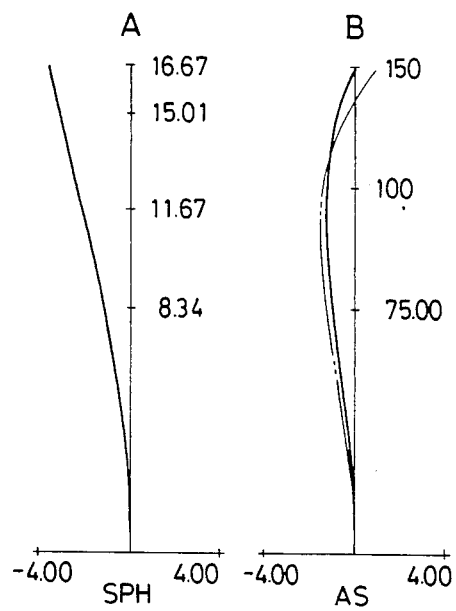

FIGS. 10A and 10B show spherical aberration and astigmatism respectively in the one-to-one magnification (m=1.00) in the third embodiment of this invention. FIGS. 11A and 11B show similar aberrations respectively when the magnification m is changed to 0.63. As in the previous embodiments, the solid lines designate aberrations in the sagittal direction while the two-dot chain lines denote aberrations in the meridional direction.

Figure 12A:
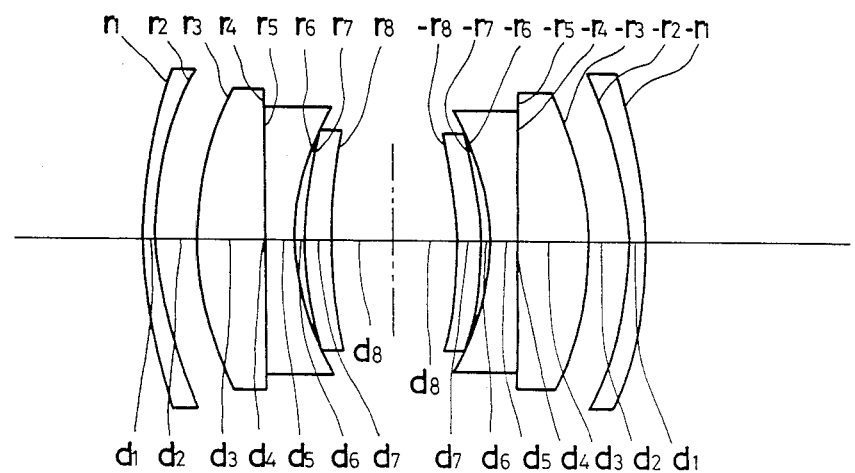
FIG. 12A is a cross-sectional view of a lens system which is a fourth embodiment of this invention.

FIG. 12 shows a zoom lens system which is a fourth embodiment of this invention. FIG. 12A shows the zoom lens in its one-to-one magnification position. This fourth embodiment is different from the third embodiment in that all of the lenses are separated from one another in the fourth embodiment. Various values in the fourth embodiment are as follows:

|   | Curvature Radius $\gamma$ | Gap d | Dispersion $v_d$ | Refractive Index $n_d$ |
|---|---------|-------|-------|--------|
| 1 | 77.91   | 3.50  | 42.80 | 1.5673 |
| 2 | 65.41   | 7.55  | —     | 1      |
| 3 | 54.51   | 14.00 | 48.30 | 1.6667 |
| 4 | 883.87  | 0.20  | —     | 1      |
| 5 | 772.77  | 5.60  | 39.20 | 1.5955 |
| 6 | 42.52   | 2.27  | —     | 1      |
| 7 | 60.51   | 5.50  | 50.90 | 1.6584 |

-continued

| | Curvature Radius $\gamma$ | Gap d | Dispersion $\nu_d$ | Refractive Index $n_d$ |
|---|---|---|---|---|
| 8 | 97.30 | 12.21 | — | 1 |
| 9 | 0.0 | 12.21 | — | 1 |
| 10 | −97.30 | 5.50 | 50.90 | 1.6584 |
| 11 | −60.51 | 2.27 | — | 1 |
| 12 | −42.52 | 5.60 | 39.20 | 1.5955 |
| 13 | −772.77 | 0.20 | — | 1 |
| 14 | −883.87 | 14.00 | 48.30 | 1.6667 |
| 15 | −54.51 | 7.55 | — | 1 |
| 16 | −65.41 | 3.50 | 42.80 | 1.5673 |
| 17 | −77.91 | — | — | — |

Figure 12B:
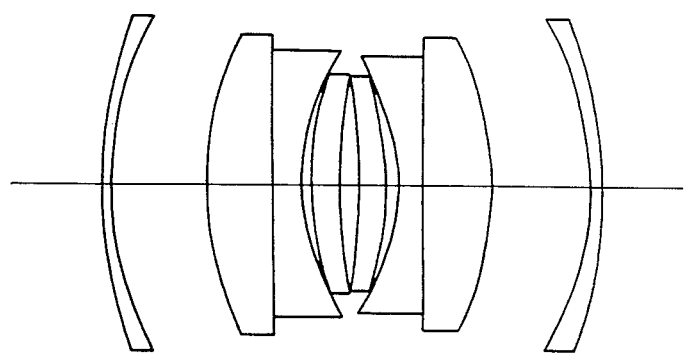
FIG. 12B is a view similar to FIG. 12A, showing the same lens system in a different position.

When the magnification m is changed to 0.63, the forward and rearward lens groups are symmetrically moved relative to the diaphragm to such a position as shown in FIG. 12B so that the gaps $d_2$ and $d_8$ will be changed to 17.84 mm and 1.92 mm, respectively.

Figure 13:
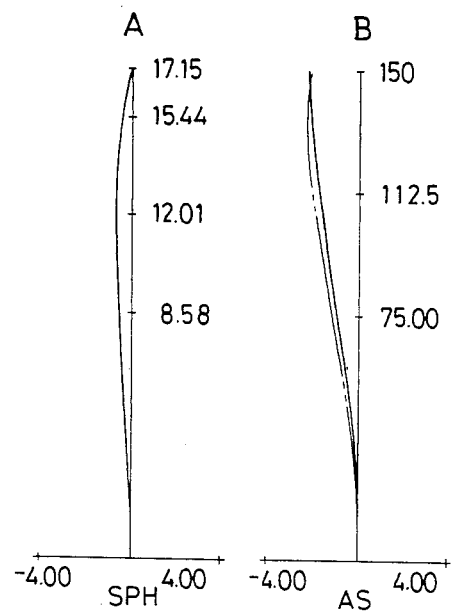
FIGS. 13 and 14 are graphs illustrating various aberrations in the fourth embodiment shown in FIGS. 12A and 12B.
Figure 14:
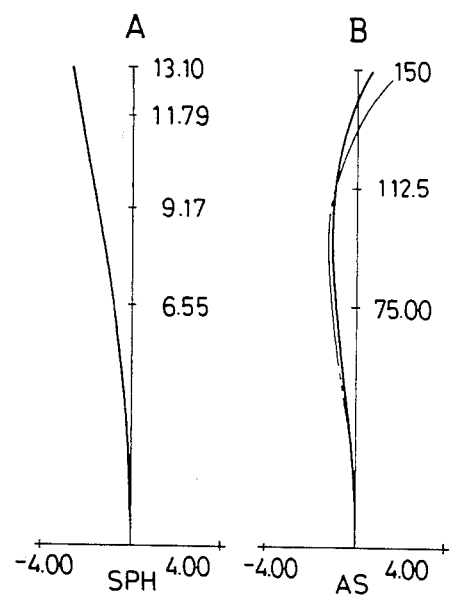

FIGS. 13A and 13B show spherical aberration and astigmatism respectively in the changed magnification (m=1) in the fourth embodiment. FIGS. 14A and 14B show similar aberrations respectively when the magnification m is changed to 0.63. It will be apparent from these figures that Petzval Sum can be decreased to 0.089.

Figure 15A:
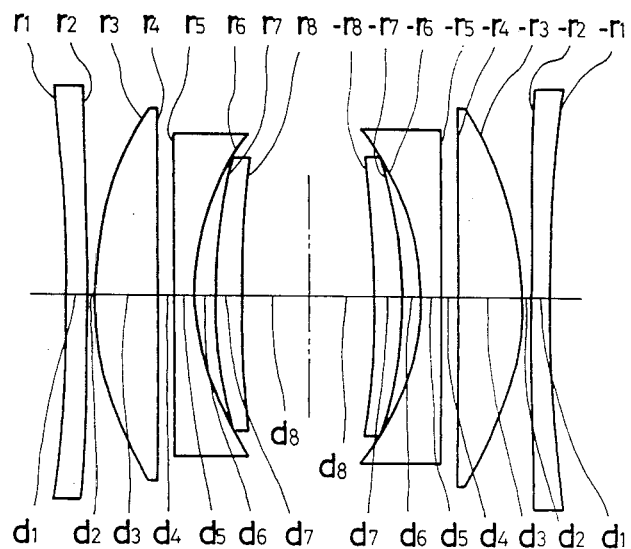
FIG. 15A is a cross-sectional view of a lens system which is a fifth embodiment of this invention.
Figure 15B:
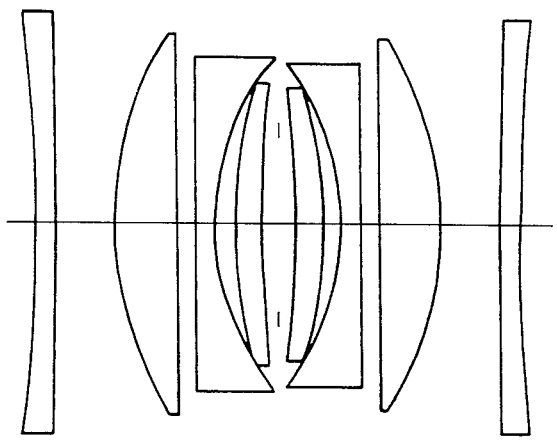
FIG. 15B is a view similar to FIG. 15A, showing the same lens system in a different position.

A fifth embodiment of this invention is shown in FIG. 15. FIG. 15A shows the lens system of this embodiment in its one-to-one magnification position. Various values in the fifth embodiment are shown below.

| | Curvature Radius $\gamma$ | Gap d | Dispersion $\nu_d$ | Refractive Index $n_d$ |
|---|---|---|---|---|
| 1 | −325.32 | 4.00 | 42.80 | 1.56732 |
| 2 | −1236.60 | 1.71 | — | 1 |
| 3 | 62.05 | 12.50 | 49.60 | 1.77250 |
| 4 | 10851.00 | 3.64 | — | 1 |
| 5 | −1492.50 | 3.50 | 39.70 | 1.65412 |
| 6 | 46.85 | 3.66 | — | 1 |
| 7 | 84.89 | 5.50 | 48.30 | 1.66672 |
| 8 | 194.40 | 13.07 | — | 1 |
| 9 | 0.0 | 13.07 | — | 1 |
| 10 | −194.40 | 5.50 | 48.30 | 1.66672 |
| 11 | −84.89 | 3.66 | — | 1 |
| 12 | −46.85 | 3.50 | 39.70 | 1.65412 |
| 13 | 1492.50 | 3.64 | — | 1 |
| 14 | −10851.0 | 12.50 | 49.60 | 1.77250 |

Figure 16:
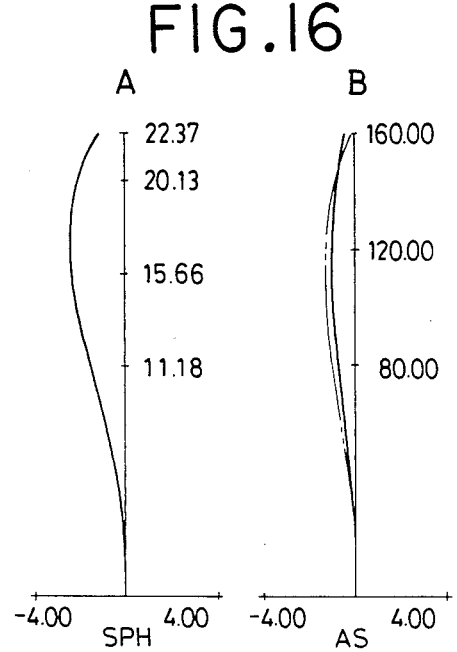
FIGS. 16 and 17 are graphs illustrating various aberrations in the fifth embodiment shown in FIGS. 15A and 15B.
Figure 17:
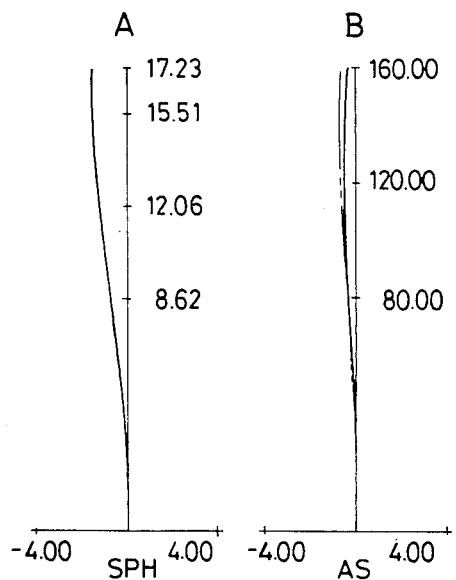

FIGS. 16A and 16B show spherical aberration and astigmatism respectively in the one-to-one magnification in the fifth embodiment. FIGS. 17A and 17B show similar aberrations respectively when the magnification is changed. It will be apparent from these figures that Petzval Sum can be decreased to 0.051.

Figure 18:
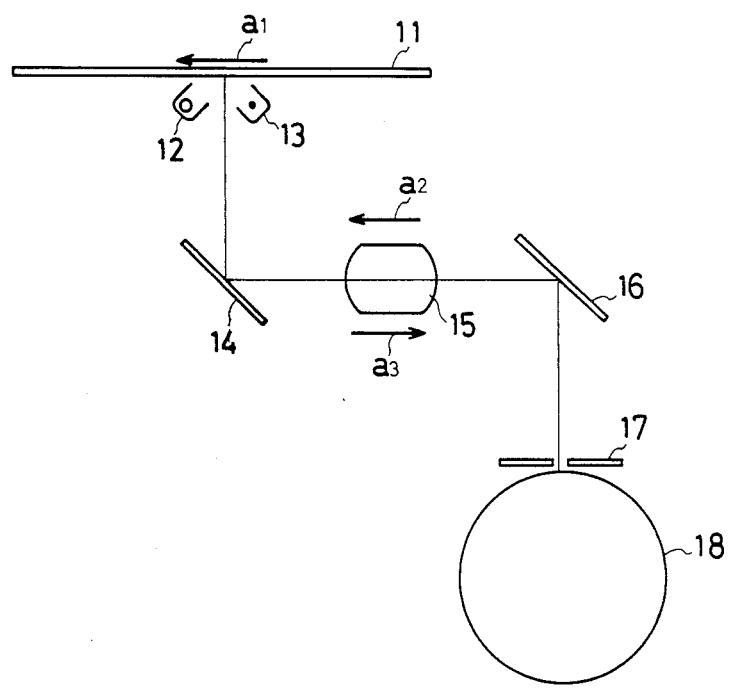
FIG. 18 is a view showing an example of a copying machine to which this invention is applied.

FIG. 18 is a schematic view showing a copying machine which utilizes a transmission type zoom lens system according to this invention. In FIG. 18, a platen 11 for supporting originals is moved in a direction as shown by an arrow $a_1$. Reference numerals 12 and 13 designate illumination systems; 14 a fixed reflection mirror; 15 a zoom lens system according to this invention; 16 a fixed reflection mirror; 17 a slit; and 18 a photosensitive drum. Various components located around the photosensitive drum 18 are omitted since they are not part of this invention. Supposing that the zoom lens 15 is in a position for imaging in the one-to-one magnification in FIG. 18, the entire zoom lens 15 is moved as one body in a direction as shown by an arrow $a_2$ with the lens groups contained therein being moved as described hereinbefore in order to enlarge the image of an original to be imaged on the photosensitive drum.

If it is desired that the image is reduced, the zoom lens 15 is moved as one body in a direction as shown by an arrow $a_3$ with the lens groups therein being moved as described hereinbefore.

Figure 19:
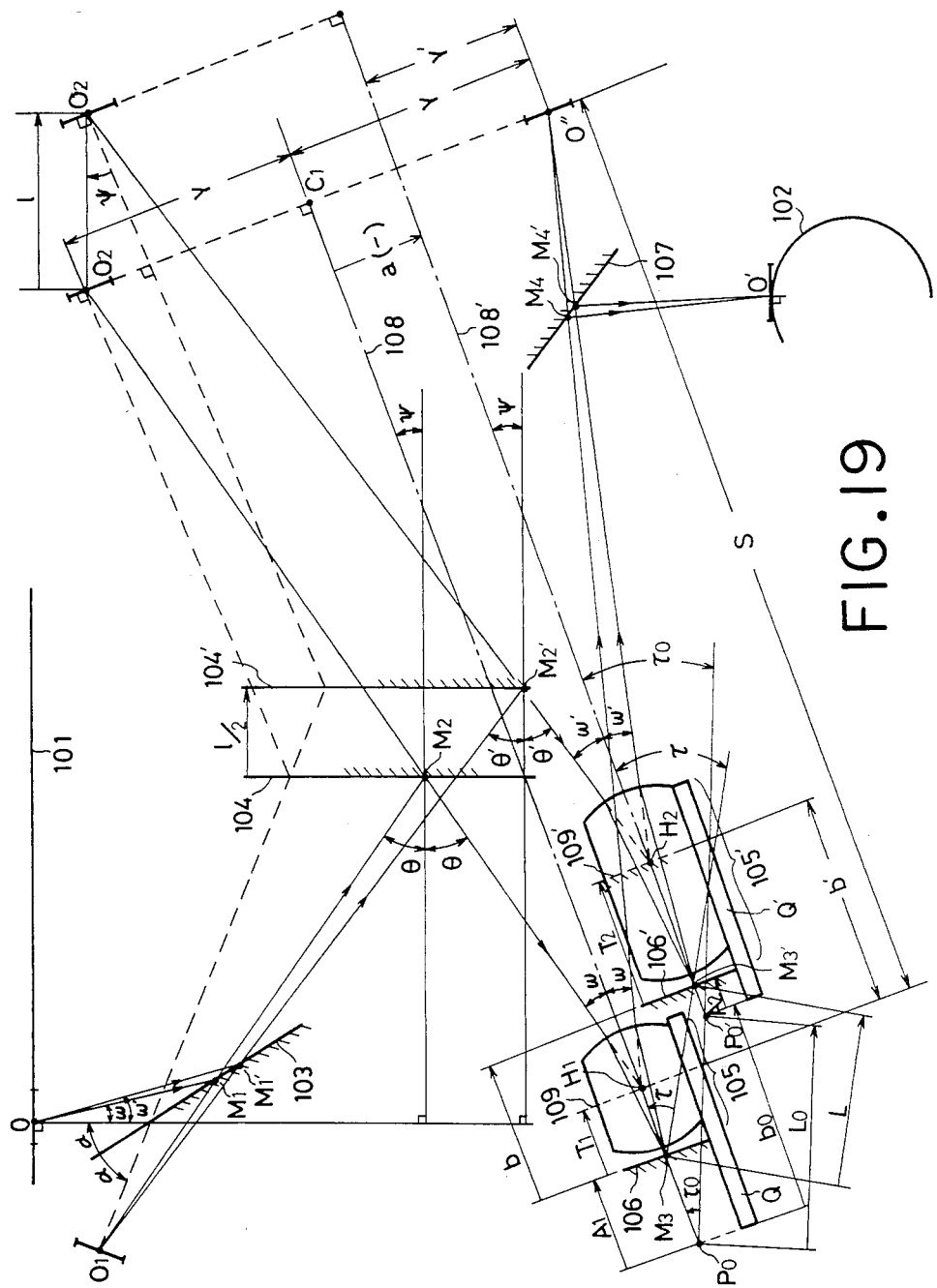
FIG. 19 illustrates how to compensate the optical path length in a copying machine which uses an in-mirror zoom lens system relating to this invention.

Although the transmission type variable optical system according to this invention has been described, this invention can be applied to an in-mirror type zoom lens system wherein a plane reflection mirror is located in place of the diaphragm and wherein half of the remaining transmission lenses are also utilized, because the optical system of this invention is completely symmetric with respect to the diaphragm. If this in-mirror type zoom lens is used to image between a stationary object plane and a stationary image plane, compensation of the optical path length cannot be effectively made as in the transmission type zoom lens. FIG. 19 shows how to effectively compensate the optical path length in this in-mirror type zoom lens which is applied to a copying machine. In such an arrangement as shown in FIG. 19, a zoom-lens carrier Q is originally moved relative to a second scan mirror 104 at a ratio of 2 m to 1 (m is a positive constant) so that the optical path length will be compensated. A first scan mirror 103 is maintained at its original position when the magnification is changed. Upon change of the magnification, the lens carrier Q is moved from a position $P_0$ to another position $P_0$ to locate at such a state Q' that it is directed at an angle $\tau_o$ included with the optical axis 108. At this time, part of the lens components of the in-mirror type zoom lens 105 is shifted on the lens carrier Q in the optical axis direction so that the focal length thereof will be suitably set.

After the in-mirror type zoom lens and the second scan mirror have been set at their original positions, the in-mirror zoom lens 105' is fixed while the first scan mirror 103 is moved relative to the second scan mirror 104 at a ratio of 2:1 to subject the original to slit-exposure scan. Supposing that the focal length of the in-mirror type zoom lens is $f_0$ in the one-to-one magnification and that it is f when the magnification is changed (the copy magnification at this time is $\beta$ which is generally negative), the focal length f is set to fulfill the following formula:

$$f = \frac{2f_0 \tan\omega \cos\psi}{\left\{ m\left(1 - \frac{1}{\beta}\right) \sin\tau_o - \sin\psi \right\}(1 - \beta)}$$

where $\omega$ is an angle of view relative to the center of a slit-shaped image due to the in-mirror type zoom lens when copying is effected in the one-to-one magnification in a cross-section which is perpendicular to the surface of the original in the slit-exposure scan direction and passed through the optical axis of the in-mirror type zoom lens; $\psi$ is an angle included between the optical axis of the in-mirror type zoom lens and the platen in the same cross-section; and $\tau_o$ is an angle included between the optical axis of the zoom lens and the direction of movement of the lens carrier in the same cross-section upon copying in changed magnifications. In this connection, these values are measured to be positive in the arrow direction and reversely to be negative in the opposite direction unless negative values are particularly referred to.

In FIG. 19, a typical optical-path converging from a point O on the original 101 to another point O' on the photosensitive surface 102 is depicted to be an optical path subjected to reflection at the center point $M_3$ of a mirror 106 in the in-mirror type zoom lens, that is, an optical path of chief ray ($O \rightarrow M_1 \rightarrow M_2 \rightarrow M_3 \rightarrow M_4 \rightarrow O'$). The points $M_1$, $M_2$ and $M_4$ are herein defined to be reflection points of the chief ray in the respective mirrors. Considering mirror images in the respective mirrors and further a principal plane 109, that is, the plane of an image of the mirror 106 due to a lens 105, an object point $O_2$ will be reflected at a point $H_1$ and then imaged at an image point $O''$ when the magnification is not changed while an object point $O_2'$ will be reflected at a point $H_2$ and then imaged at the same image point $O''$ when the magnification is changed.

When the magnification is one-to-one, a relationship between an angle $\alpha$ included between the first scan mirror 103 and the normal line in the original surface 101 and the angle $\psi$ included between the optical axis 108 and the original surface 101 is represented by the following formula:

$$\alpha = \tfrac{1}{2}\left(\tfrac{\tau}{2} - \psi\right)$$

When the magnification is changed, the second scan mirror 104 is moved parallel to the original surface 101 from the one-to-one magnification position by a distance of $l/2$. Furthermore, the in-mirror type zoom lens 105 is moved to a position as shown by 105' with the angle thereof including with the original 101 being maintained constant while the lens carrier being moved in a direction of angle $\tau_o$ included between the carrier and the optical axis 108 by a predetermined distance $L_o$. At the same time, the in-mirror type zoom lens is shifted on the lens carrier from a position $A_1$ in which the zoom lens is spaced apart from the reference point $P_0$ along the optical axis by a predetermined distance in the one-to-one magnification to another point $A_2$ in which the zoom lens is spaced apart from the reference point $P_0'$ by a predetermined distance upon change of the magnification. As a result, the in-mirror type zoom lens is moved in a direcion of angle $\tau$ included between the zoom lens and the optical axis 108 by a predetermined distance L to be shifted from the position 105 to the position 105'. Thus, the focal length of the in-mirror type zoom lens will be changed suitably.

It is supposed in FIG. 19 that a distance along the optical axis 108 from the main point $H_1$ of the lens 105 to an object plane including the object point $O_2$ (a plane being flush with the image plane including the image point) in the one-to-one magnification is S; and a height from the optical axis to the object point $O_2$ is Y. Also assuming that the shifting movement of the zoom lens from the main point $H_1$ in the changed magnification to the main point $H_2$ is divided into a component b' extending from the main point $H_1$ of the lens 105 along the optical axis in the one-to-one magnification and a component a (being negative in the illustrated extending perpendicular to the optical axis and that the shifting movement L of the mirror 106 in the changed magnification includes a component b moving along the optical axis while the shifting movement $L_o$ of the lens carrier includes a component $b_0$ moving along the optical axis, these values are related with one another as follows;

$$-a = L_o \sin \tau_o = L \sin \tau \quad (1)$$

$$b_0 = L_o \cos \tau_o \quad (2)$$

$$b = L \cos \tau \quad (3)$$

Supposing that a distance from the in-mirror surface 106 in the one-to-one magnification to the main point $H_1$ is $T_1$; a distance from the mechanical reference point $P_0$ to the in-mirror surface 106 is $A_1$; a distance from the in-mirror surface 106' in the changed magnification to the main point $H_2$ is $T_2$; and a distance from the mechanical reference point $P_0'$ in-mirror surface 106' is $A_2$, the following relationship are fulfilled.

$$b_0 = b' + \Delta T + \Delta A \quad (1)$$

$$b_0 = b + \Delta A \quad (2)$$

where $$\Delta T \equiv T_1 - T_2$$

$$\Delta A \equiv A_1 - A_2.$$

When the magnification is one-to-one, the following formula is fulfilled due to the imaging relation.

$$S = 2f_0 \quad (6)$$

$$Y = S \tan \omega \quad (7)$$

When the magnification is changed, the following formula is fulfilled. As to the image point $O''$, $$S - b' = f(1 - \beta) \quad (8)$$

As to the object point $O_2'$, $$S - b' + l \cos \psi = f(1 - 1/\beta) \quad (9)$$

As to the angle of view, further, the following formula is obtained. In relation to the object point $O''$, $$\tan \omega' = Y + a/S - b' \quad (10)$$

In relation to the object point $O_2'$, $$\tan \omega' = Y - l \sin \psi - a/S - b' + l \cos \psi \quad (11)$$

From the above relations, various dimensions $f_0$, $\omega$, and $\psi$ in the one-to-one magnification can be selected with respect to the changed magnifications if the predetermined magnification $\beta$ can be preselected.

Assuming that the focal length f of the in-mirror type zoom lens in the changed magnification is a parameter which will be thereafter determined, the following four dimensions are given:

From the formulas (8) and (9), the shift $l/2$ of the second scan mirror is represented by the following formula:

$$l/2 = f(\beta - 1/\beta)/2 \cos \psi \quad (12).$$

The shifts (b' and a) of the main point of the in-mirror type zoom lens are obtained; from the formulas (6) and (8), $$b' = 2f_0 - f(1 - \beta) \quad (13)$$

and from the formulas (10), (11), (12) and (13), $$a = -(1 + \beta/1 - \beta) \times \{2f_0 \tan \psi + f(1 - \beta) \tan \psi\} \quad (14)$$

From the formulas (6), (7), (10), (13) and (14), the angle of view $\omega'$ used in the changed magnification is obtained as follows;

$$\tan\omega' = -2\beta/f(1-\beta)^2 \times \{2f_0\tan\omega - \tfrac{1}{2}f(1-1/\beta)\tan\psi\} \quad (15).$$

At this state, there is a degree of freedom in setting the focal length f. It is required that a ratio of the shift l/2 of the second mirror to the shift $L_o$ of the in-mirror zoom lens carrier is selected to be 1:2 m (m being positive constant) in order to readily change the magnification in a mechanical manner. Namely, there is set a relation: $L_o = 2$ m (l/2).

From the foregoing, the following relationship with respect to the values f, $\Delta A$ and $\Delta T$ is finally obtained.

$$f = \frac{2f_0\tan\omega\cos\psi}{\left\{m\left(1-\frac{1}{\beta}\right)\sin\tau_o - \sin\psi\right\}(1-\beta)} \quad (16)$$

and $$\Delta A = \{1 - m(1 + 1/\beta)\cos\tau_o/\cos\psi\}(1-\beta)f - (2f_o + \Delta T). \quad (17)$$

In the above formula (16), the angle $\tau_o$ can be suitably selected dependent on various conditions in design.

What is claimed is:

1. A variable magnification optical system comprising, in sequence from the object to the image side, a first single negative lens, a second positive lens, a third negative lens, a fourth positive lens, a diaphragm, a fifth positive lens, a sixth negative lens, a seventh positive lens and an eighth single negative lens, said first and eighth single negative lenses being disposed symmetrically with respect to the diaphragm, each of said fourth and fifth positive lenses being in the form of a meniscus lens having a concave surface facing the diaphragm, each of said third and sixth negative lenses being in the form of a lens having a concave surface facing said diaphragm, each of said second and seventh positive lenses being in the form of a lens having a surface opposite from said diaphragm which is concave with respect to said diaphragm, said second, third and fourth lenses forming a first positive lens group, said fifth, sixth and seventh lenses forming a second positive lens group, said first and second positive lens groups being movable symmetrically relative to said diaphragm with said first and eight single negative lenses fixed relative to said diaphragm so that the focal length of said optical system may be changed.

2. The variable magnification optical system as defined in claim 1 wherein $|F_2/F_1| > 1.5$ is fulfilled where the focal length of each of said first and eight single negative lenses is $F_1$ and the focal length of each of said first and second positive lens groups is $F_2$.

3. The variable magnification optical system as defined in claim 1 wherein each of said third and sixth negative lenses is in the form of a meniscus lens formed by a positive lens and a negative lens which are bonded to each other and having a concave surface facing to said diaphragm and wherein each of said second and seventh positive lenses is in the form of a meniscus lens having a concave surface facing to said diaphragm.

4. The variable magnification optical system as defined in claim 1 wherein the opposed surfaces of said second positive lens and third negative lens are equal to each other in curvature radius and bonded to each other and wherein the opposed surfaces of said sixth negative lens and seventh positive lens are equal to each other in curvature radius and bonded to each other.

5. A variable magnification optical system having a plane reflection mirror contained therein, comprising, in sequence, a first single negative lens, a second positive lens, a third negative lens, a fourth positive lens and a plane reflection mirror, said fourth positive lens being in the form of a meniscus lens having a concave surface facing said plane reflection mirror, said third negative lens being in the form of a lens having a concave surface facing said plane reflection mirror, and said second positive lens being in the form of a lens having a surface opposite from said plane reflection mirror which is concave with respect to said plane reflection mirror, said second positive lens, third negative lens and fourth positive lens forming a positive lens group, said positive lens group being movable as one body relative to said plane reflection mirror with the spacing between said first single negative lens and said plane reflection mirror being fixed so that the focal length of said optical system may be changed.

6. The variable magnification optical system as defined in claim 5 wherein $|F_2/F_1| > 1.5$ is fulfilled where the focal length of said first single negative lens is $F_1$ and the focal length of said positive lens group is $F_2$.

7. The variable magnification optical system as defined in claim 5 wherein said third negative lens is in the form of a meniscus lens formed by a positive lens and a negative lens which are bonded to each other and having a concave surface facing to said plane reflection mirror and wherein said second lens is in the form of a meniscus lens having a concave surface facing to said plane reflection mirror.

8. The variable magnification optical system as defined in claim 5 wherein the opposed surfaces of said second positive lens and third negative lens is equal to each other in curvature radius and bonded to each other.

9. A variable magnification optical system comprising, in sequence from the object side to the image side, a first negative lens, a second positive lens, a third negative lens, a fourth positive lens, a diaphragm, a fifth positive lens, a sixth negative lens, a seventh positive lens and an eighth negative lens, said first and eighth single negative lenses being disposed symmetrically with respect to the diaphragm, each of said fourth and fifth postive lenses being a meniscus lens having a concave surface facing the diaphragm, each of said third and sixth negative lenses being a lens having a concave surface facing said diaphragm, each of said second and seventh positive lenses being a lens having a surface opposite said diaphragm which is concave with respect to said diaphragm, said second, third and fourth lenses forming a first positive lens group, said fifth, sixth and seventh lenses forming a second positive lens group, said first and second positive lens groups being movable symmetrically relative to said diaphragm, said first and eighth negative lenses being fixed relative to said diaphragm so that the focal length of said optical system may be changed.

10. The variable magnification optical system as defined in claim 9 wherein $|F_2/F_1| > 1.5$ is fulfilled where the focal length of each of said first and eighth negative lenses is $F_1$ and the focal length of each of said first and second positive lens groups is $F_2$.

11. The variable mangification optical system as defined in claim 9 wherein each of said third and sixth negative lenses is a meniscus lens formed by a positive lens and a negative lens bonded to each other and having a concave surface facing said diaphragm and wherein each of said second and seventh positive lenses is a mensicus lens having a concave surface facing said diaphragm.

12. The variable magnification optical system as defined in claim 9 wherein the opposed surfaces of said second positive lens and third lens are equal to each other in curvature radius and bonded to each other and wherein the opposed surfaces of said sixth negative lens and seventh positive lens are equal to each other in curvature radius and bonded to each other.

13. A variable magnification optical system having a plane reflection mirror contained therein, comprising, in sequence, a first negative lens, a second positive lens, a third negative lens, a fourth positive lens and a plane reflection mirror, said fourth positive lens being a meniscus lens having a concave surface facing said plane reflection mirror, said third negative lens being a lens having a concave surface facing said plane reflection mirror, and said second positive lens being a lens having a surface opposite said plane reflection mirror which is concave with respect to said plane reflection mirror, said second positive lens, third negative lens and fourth positive lens forming a positive lens group, said positive lens group being movable as one body relative to said plane reflection mirror with the spacing between said first negative lens and said plane reflection mirror being fixed so that the focal length of said optical system may be changed.

14. The variable magnification optical system as defined in claim 13 wherein $|F_2/F_1| > 1.5$ is fulfilled where the focal length of said first negative lens in $F_1$ and the focal length of said positive lens group is $F_2$.

15. The variable magnification optical system as defined in claim 13 wherein said third negative lens is a meniscus lens formed by a positive lens and a negative lens bonded to each other and having a concave surface facing said plane reflection mirror and wherein said second lens is a meniscus lens having a concave surface facing said plane reflection mirror.

16. The variable magnification optical system as defined in claim 13 wherein the opposed surfaces of said second positive lens and third negative lens are equal to each other in curvature radius and bonded to each other.

17. A variable magnification optical system consisting of, in sequence from the object side to the image side, a first single negative lens, a positive lens subsystem, a second single negative lens and a diaphragm disposed between said first single negative lens and said second single negative lens, lenses of said positive lens subsystem being movable relative to said diaphragm with said first and second single negative lenses being fixed relative to said diaphragm so that the focal length of said optical system may be changed.

18. The variable magnification optical system as defined in claim 17 wherein said positive lens subsystem consists of a first positive lens group and a second positive lens group which are movable symmetrically relative to said diaphragm.

19. The variable magnification optical system as defined in claim 18 wherein said first positive lens group consists of, in sequence from the object side to the image side, a third positive lens, a fourth negative lens and a fifth positive lens, and said second positive lens group, in sequence from the object side to the image side, a sixth positive lens, a seventh negative lens and an eighth positive lens.

20. A variable magnification optical system having a plane reflection mirror contained therein, consisting of, in sequence, a first single negative lens, a positive lens group and a plane reflection mirror, said positive lens group being movable relative to said plane reflection mirror with said first single negative lens and said plane reflection mirror being fixed so that the focal length of said optical system may be changed.

21. The variable magnification optical system as defined in claim 20 wherein said positive lens group consists of a second positive lens, a third negative lens and a fourth positive lens.

* * * * *

UNITED STATES PATENT AND TRADEMARK OFFICE
CERTIFICATE OF CORRECTION

PATENT NO. : 4,560,242

DATED : December 24, 1985

INVENTOR(S) : MITSUHIRO TOKUHARA, ET AL.

It is certified that error appears in the above-identified patent and that said Letters Patent is hereby corrected as shown below:

Column 2, line 20, delete "fixed" (first occurrence).

Column 4, line 19, "position." should read --position;--.

Column 5, line 65, "glass and" should read --glass) and--.

Column 6, line 8, "Suppoding" should read --Supposing--.

Column 7, line 29, "(m-0.61)," should read --(m=0.61),--.

Column 8, line 39, "w-th" should read --with--.

Column 10, line 26, "$P_0$" should read --$P_0'$--.

Column 11, line 58, "illustrated extending" should read --illustrated embodiment) extending--;
line 64, "as follows;" should read --as follows:--.

Column 12, line 10, "$P_0'$ in-mirror" should read --$P_0'$ to the in-mirror--;
line 11, "relationship" should read --relationships--.

UNITED STATES PATENT AND TRADEMARK OFFICE
CERTIFICATE OF CORRECTION

PATENT NO. : 4,560,242  
DATED : December 24, 1985  
INVENTOR(S) : MITSUHIRO TOKUHARA, ET AL.

It is certified that error appears in the above-identified patent and that said Letters Patent is hereby corrected as shown below:

Column 13, line 4, "as follows;" should read --as follows:--;
            line 6, "($\spadesuit$-1/B)tan" should read (B-1/B)tan--;
            line 30, "object to" should read --object side to--;
            line 49, "eight single" should read --eighth single--;
            line 54, "eight single" should read --eighth single--;
            line 61, "facing to" should read --facing--;
            line 64, "facing to" should read --facing--.

Column 14, line 32, "facing to" should read --facing--;
            line 34, "facing to" should read --facing--;
            line 38, "is" should read --are--.

Column 15, line 1, "mangification" should read --magnification--
            line 11, "third lens" should read --third negative lens--;

Signed and Sealed this

Twenty-first Day of October, 1986

[SEAL]

Attest:

DONALD J. QUIGG

Attesting Officer      Commissioner of Patents and Trademarks